United States Patent [19]
Frederiksen et al.

[11] 3,719,668
[45]*March 6, 1973

[54] SEMI-SYNTHETIC PENICILLIN ESTERS

[75] Inventors: Erling Knud Frederiksen, Holte; Wagn Ole Godtfredsen, Vaerlose, both of Denmark

[73] Assignee: Lovens Kemiske Fabrik Produktion-saktieselskab, Ballerup, Denmark

[ * ] Notice: The portion of the term of this patent subsequent to Oct. 10, 1989, has been disclaimed.

[22] Filed: March 13, 1970

[21] Appl. No.: 19,462

[30] Foreign Application Priority Data

March 18, 1969 Great Britain......................14,218/69
July 21, 1969 Great Britain......................36,581/69

[52] U.S. Cl..............................260/239.1, 424/271

[51] Int. Cl. ..............................................C07d 99/14
[58] Field of Search....................................260/239.1

[56] References Cited

UNITED STATES PATENTS

| | | | |
|---|---|---|---|
| 3,245,984 | 4/1966 | Testa et al. | 260/239.1 |
| 3,250,679 | 5/1966 | Jansen et al. | 260/239.1 |

*Primary Examiner*—Nicholas S. Rizzo
*Attorney*—Stowell and Stowell

[57] ABSTRACT

A new group of semi-synthetic penicillin esters, which are esters of a α-aryl-β-aminoethyl penicillins, are described and claimed together with a process for their production.

7 Claims, No Drawings

SEMI-SYNTHETIC PENICILLIN ESTERS

This invention relates to a group of new semi-synthetic penicillin esters, and to methods of producing them.

In particular, the invention relates to a group of new esters of α-aryl-β-aminoethyl penicillins, the esters having the formulas:

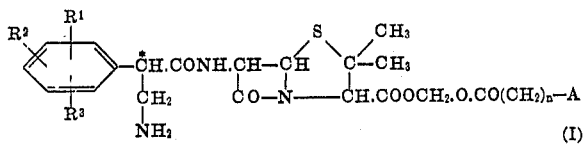

(I)

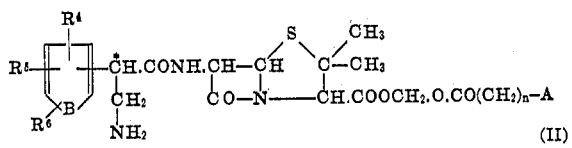

(II)

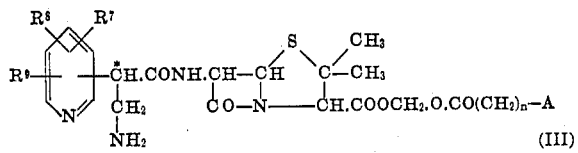

(III)

wherein the asterisk indicates an asymmetric carbon atom; $R^1$ to $R^9$ are each a hydrogen or halogen atom, or a trifluoromethyl, nitro, alkyl, hydroxy, alkoxy, alkylthio, alkylsulphonyl, or cycloalkyl radical with from five to seven carbon rings atoms, a cycloalkoxy radical with from five to seven ring atoms, an aryl, aralkyl, aralkyloxy, aralkylthio, alkanoyl, alkanoylamino, amino, or mono- or dialkylamino radical, and in formula (I) $R^2$ together with either $R^1$ or $R^3$ can complete a carbocyclic ring; in formula (II) $R^5$ together with either $R^4$ or $R^6$ can complete a carbocyclic ring; in formula (III) $R^8$ together with either $R^7$ or $R^9$ can complete a carbocyclic ring; in formula (II) B stands for oxygen, sulphur or $\diagdown\!\!\mathrm{NH}\diagup$;

whereas in formulas (I), (II), (III) $n$ is an integer from 0 to 5; and A is an unsubstituted or substituted aliphatic, alicyclic, aromatic, or heterocyclic radical; and to salts of these penicillin esters with pharmaceutically acceptable acids; and to methods of preparing the esters and salts.

Due to the asymmetric carbon atom in the side chain of the compounds of formulas (I), (II), and (III), the compounds exist in two epimeric forms, and the invention comprises both of the epimeric forms as well as mixtures thereof. The form in which the compounds are obtained depends on which of the epimeric starting materials and which methods are used to make the compounds. The mixtures of the epimeric forms may be separated by fractional crystallization or other known methods.

It is an object of the present invention to provide new penicillin esters which with a view to adequate absorption, distribution in the organism, and the like factors possess advantageous properties.

When the esters of formulas (I), (II), and (III) are exposed to the influence of enzymes present in the body fluids, or enzymes produced by micro-organisms, e.g., pathogenic micro-organisms, they are readily hydrolysed to the corresponding free penicillin. This hydrolysis is an important feature of the compounds of the invention. It is assumed that the first step consists in an enzymatic hydrolysis by non-specific esterases, to give the corresponding hydroxymethyl esters which subsequently decompose spontaneously to the free penicillin.

It is known that free penicillins corresponding to the esters of formulas (I), (II), and (III) are insufficiently absorbed upon oral administration, and in some cases not at all or at least less than one per cent, and it is generally assumed that the amino group attached to the side chain is responsible for this inadequate absorption.

According to experiments carried out in connection with the present invention it has been demonstrated in animal tests that, upon oral administration of the penicillin esters of formulas (I), (II), and (III), extremely high concentrations of the corresponding free penicillins are found in the blood and tissues due to efficient absorption combined with a rapid hydrolysis in the organism. Thus, the penicillin esters of the invention are considered particularly suited for oral administration in clinical therapy of patients suffering from infectious diseases, the successful treatment of which requires a high concentration of penicillin in the blood and tissues for a long period of time. In such cases, the desirable high concentration of the previously known penicillins is normally obtained by administration by the parenteral route which is inconvenient to the patient, if the treatment is prolonged, and impractical to the medical practitioner.

The compounds of formulas (I), (II), and (III) are well tolerated compounds which are preferably administered, in clinical practice, in the form of one of their salts mixed with carriers and/or auxiliary agents and in any suitable form of pharmaceutical presentation for oral use.

In such compositions, the proportion of therapeutically active material to carrier substance and auxiliary agent can be between 1 and 95 percent. The compositions can either be worked up to pharmaceutical forms of presentation such as tablets, pills or dragees, or they can be filled in medical containers, such as capsules, or as far as liquid mixtures are concerned, they can be filled into bottles. Pharmaceutical organic or inorganic solid or liquid carriers suitable for oral, enteral or topical administration can be used to make up the composition. Gelatine, lactose, starch, magnesium stearate, talc, vegetable and animal fats and oils, gums, polyalkylene glycol, and other known carriers for medicaments are all suitable as carriers. The preferred salt of the esters is the hydrochloride, but salts with other inorganic or organic acids, including antibiotically active acids, may be used, e.g., the hydrobromide, the hydroiodide, the sulphonate, the sulphamate, the phosphate, the acetate, the tartrate, the maleate, the citrate, the benzoate, and the phenoxymethyl-penicillinate. Furthermore, the compositions may contain other pharmaceutically active components which can appropriately be administered together with the ester in the treatment of infectious diseases, such as other suitable antibiotics.

In the preferred penicillins of formulas (I), (II), and (III), the term "alkyl," whenever used, means loweralkyl, including straight and branched aliphatic hydrocarbon chains with from one to six carbon atoms in the chain. In formulas (I), (II), and (III) A may, in particular, represent an aliphatic hydrocarbon radical having from one to six carbon atoms, in which the carbon chain can be straight or branched, saturated or unsaturated, such as methyl, ethyl, propyl, isopropyl, butyl, sec. and tert. butyl, pentyl, or hexyl; an alicyclic, carbocyclic radical having from three to 10 carbon atoms as ring members, and in which the ring or rings may be saturated or may contain one or two double bonds depending on the number of carbon atoms, such as cyclopentyl, cyclohexyl, 1-adamantyl, 1-bicyclo[2,2,2]octyl, cyclopentenyl or cyclohexenyl, in which the double bond may be placed in the 2,3- or 3,4-position; an aromatic radical, such as a monocyclic carbocyclic aryl radical, e.g., phenyl or a substituted phenyl radical, a bicyclic carbocyclic aryl radical, e.g., 1- or 2-naphthyl or a substituted naphthyl radical; a heterocyclic aryl radical which may contain from five to 10 atoms as ring members, such as pyridyl, pyrazinyl, pyrimidyl, thienyl, furyl, or quinolyl, in which the hetero atom may be in any of the available positions, and which may further have substituents in one or more of the remaining positions.

The radical A may, as already mentioned, have further substituents, such as lower alkyl, e.g., methyl, ethyl, propyl, isopropyl, or butyl; lower alkoxy, e.g., methoxy or ethoxy; lower alkylthio, e.g., methylmercapto or ethylmercapto; halo-lower alkyl, e.g., mono-, di- or trifluoromethyl, mono-, di- or trichloromethyl, their ethyl homologues, or the corresponding bromo derivatives; halogen atoms, e.g., fluorine, bromine or chlorine; or nitro groups. The substituents may be placed in any of the possible positions.

According to observations in preliminary tests, the penicillin esters of formula (II) having a mono-nuclear hetero ring, and preferably containing S as the hetero atom, are in particular in possession of the advantageous properties aforesaid and are supposed to be of high clinical value.

It is another object of the invention to provide a method of producing the compounds of the formulas (I), (II), and (III). The method of the invention comprises a first step in which a compound of one of the formulas (IVa), (IVb), and (IVc):

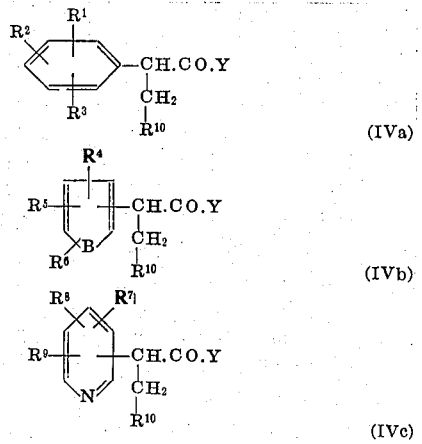

wherein $R^1$ to $R^9$ and B are as hereinbefore defined, and $R^{10}$ is an amino group or a substituted amino group (Z—NH—), or a radical which can be converted into an amino group, such as azido, nitro, or halogen, and in which $R^1$ to $R^9$, if necessary, are protected in suitable manner, is reacted with an ester of 6-aminopenicillanic acid of formula (V):

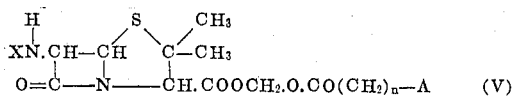

wherein $n$ and A have the meanings hereinbefore defined, —CO—Y and X—NH— defining radicals capable of reacting with each other to form a —CO—NH— bridge, whereafter, if $R^{10}$ stands for an amino group, the desired penicillin ester is recovered, or, if $R^{10}$ is not an amino group, the radical $R^{10}$ of the penicillin ester formed as an intermediate is, in a second step, converted into a free amino group in a manner known *per se*, and the desired penicillin ester is recovered.

Most of the starting materials of formulas (IVa,b,c), or the corresponding acids, Y being a hydroxyl group, are known compounds, or they can be prepared by method analogous to those by which the known compounds are prepared. In the case where $R^{10}$ stands for an amino group or a substituted amino group, they can for instance be prepared by hydrogenation of the corresponding α-aryl-α-cyanoacetic acids, many of which are known from the literature, optionally followed by standard reactions for protecting the amino group, and in the case where $R^{10}$ stands for a radical which can be converted into an amino group, the compounds of formulas (IVa, b, c) are also known or can be prepared by methods analogous to those by which the known compounds are prepared.

The radical —CO—Y of these starting substances can, for instance, be the radical of an acid halide, such as an acid chloride or bromide; of an anhydride; of a mixed anhydride with an alkyl-carbonic acid, such as isobutyl-carbonic acid, or of a carboxylic acid, an inorganic acid or a sulphonic acid; or a radical obtained by reacting the corresponding free acid with a carbodiimide or N,N'-carbonyldiimidazole or a similarly functioning compound; X in formula (V) above can be a hydrogen atom, or a tri-alkylsilyl group, the alkyl groups having maximum five carbon atoms.

The first step of the present method can be performed in an organic solvent or in a mixture thereof with water either at a low temperature or at a slightly elevated temperature. Suitable solvents are methylene chloride, chloroform, ethyl acetate, acetone, dimethylformamide, dimethylacetamide, ether, tetrahydrofuran, dioxane, and similar inert solvents. The reaction products are isolated in conventional manner, e.g., by reprecipitation or by removal of the solvent followed by recrystallization from a solvent.

A common characteristic of the substituent $R^{10}$ of the starting substances of formulas (IVa,b,c) other than amino is that it is selected from groups which, after the first step of the method, are capable of being converted to an amino group in the second step by means of methods mild enough to avoid cleavage of the molecule at the ester group or at the lactam ring. In particular, the substituent $R^{10}$ may have the formula Z—NH— where Z is a benzyloxycarbonyl radical, a p-halo-, p-nitro-, or p-methoxybenzyloxycarbonyl radical, a β,β,β-trichloro-ethoxycarbonyl or an allyloxycarbonyl radical; or Z is a sulphur-containing radical, such as a tritylsulphenyl radical, an arylsulphenyl radical, e.g., an o-nitrophenylsulphenyl radical. Z may also be a triphenylmethyl (also called trityl) radical, a tertiary butoxycarbonyl radical, or a radical obtained by reacting the free amino group with a β-dicarbonyl compound, such as acetylacetone, an acetoacetic ester, or benzoylacetone, to form enamines or Schiff bases. In general, any group represented by Z, which can be split off by reduction, by mild acid hydrolysis, or by other mild reactions known *per se* will be suitable, since experiments have shown that the esters of formulas (I), (II), and (III) formed by the reaction in question are stable under such conditions. Examples of $R^{10}$ groups, which can be converted into an amino group, include the azido group, the nitro group and halogen atoms, for instance the bromine atom.

In the case, where one or more of the radicals $R^1$ to $R^9$ is a free hydroxy group or a free amino group, these groups, if desired, can be protected during the reaction in the same way as $R^{10}$ or by other known methods, e.g., by etherification or alkylation.

In the second step of the present method, catalytic hydrogenation will be preferred when $R^{10}$ has the formula Z—NH—, and Z stands for benzyloxycarbonyl and related derivatives thereof, and for trityl. This hydrogenation is preferably performed at room temperature and at atmospheric or slightly elevated pressure in a non-reducible organic solvent or a mixture thereof with water. The preferred catalysts are noble metal catalysts, such as palladium or platinum, or Raney-nickel, but other catalysts can be uses as well. Electrolytic reduction can also be used in these cases. When Z stands for a β, β, β-trichloro-ethoxycarbonyl radical, reduction with zinc in acetic acid is preferred. A mild acid hydrolysis, for instance at a pH of about 2 in a dilute solution of hydrogen chloride in aqueous acetone, is preferred in the case where Z stands for a sulphur-containing radical, an enamine or a Schiff base. A treatment with formic acid at room temperature is especially suitable for the removal of Z, when Z is a tertiary butoxycarbonyl radical. Also known from the literature is the removal of the o-nitro-phenyl-sulphenyl radical involving a nucleophilic attack on the sulphur atom of the sulphenamide group, the best yield in the present case being obtained with sodium or potassium iodide, sodium thiosulphate, sodium hydrogen sulphide, sodium dithionite, or potassium thiocyanate. Other sulphenamide radicals can be split in the same way. If $R^{10}$ is an azido or nitro group, or a halogen atom, especially a bromine atom, these groups may be transformed into the free amino group in known manner, the azido and the nitro group by a catalytic hydrogenation, using a noble metal or Raney-Nickel as catalyst, or by an electrolytic reduction, and the halogen atom by an amination, for instance with hexamethylenetetramine.

The starting substances of formula (V) can be prepared by treatment of 6-amino-penicillanic acid in the form of a salt, such as an alkali metal salt or the triethylammonium salt, with a halomethyl ester of the formula $R^{11}$—$CH_2$—$OCO(CH_2)_n$—A in which $R^{11}$ is a halogen atom, preferably a chlorine or bromine atom, or an alkyl sulphonyloxy or an arylsulphonyloxy radical, such as a methanesulphonyloxy or toluenesulphonyloxy radical, and n and A are as defined hereinbefore.

The 6-amino-penicillanic acid may be used as such, or the 6-amino group may be protected during the esterification process. Only protecting radicals, which are easily removed without causing any cleavage of the lactam ring or the ester group, are suitable in this case, as for instance the triphenylmethyl or trimethylsilyl radical. The reaction is performed in an inert organic solvent, such as acetone, dimethylformamide, or methylene chloride, and at or below room temperature or at a slightly elevated temperature. When the amino group has been protected, the removal of the protecting group can be performed by different methods, such as hydrogenation or hydrolysis under neutral or acidic conditions, which do not result in an attack on the β-lactam ring and the ester group. The reaction products of formula (V) (X=H) are conveniently isolated as their acid addition salts with for instance p-toluenesulphonic acid or other inorganic or organic acid, such as sulphuric, phosphoric, hydrochloric, acetic, maleic, or tartaric acid.

In another embodiment of the process, the compounds of formula (V) can be prepared by esterification of any of the industrially accessible penicillins or preferably their salts with a compound of the aforementioned formula $R^{11}$—$CH_2$—$OCO(CH_2)_n$—A, in which $R^{11}$, n, and A are as hereinbefore defined, under conditions similar to those already described, whereafter the side chain of the resulting penicillin ester is split off to yield the 6-amino-penicillanic ester of formula (V) or a salt thereof.

The cleavage of the amide bond can be performed by a modification of the procedure described in the specification to Belgian Pat. No. 698,596 by reacting the 6-acylamino-penicillanic acid ester with an acid halide in the presence of an acid binding agent, such as quinoline or pyridine. The preferred acid halide is, however, phosphorus pentachloride, because in this case the reaction can be performed at low temperature, thereby increasing the stability of the intermediate formed, which presumably is an imino halide. The reaction can be performed in different solvents, but the preferred solvents are chloroform and methylene chloride.

The intermediate is not isolated, but is treated with an excess of a primary alcohol to form an imino ether. The reaction temperature and the reaction time depend on the alcohol used; in most cases temperatures from —20° C tp +20° C will be convenient.

The imino ether is not isolated, but is subjected to an acid alcoholysis or hydrolysis, cleaving the C=N bond to yield the corresponding 6-amino-penicillanic ester of formula (V). It is surprising that the lactam ring and the acyloxymethyl ester grouping are sufficiently stable under these conditions. By the generally used methods, the ester of 6-amino-penicillanic acid can be isolated from the reaction mixture as such, or in the form of a salt with an inorganic or organic acid, such as the hydrochloride or the tosylate.

The penicillin esters formed in the first step of the method, having one of the formulas (VIa), (VIb), and (VIc) ($R^{10}{\neq}NH_2$):

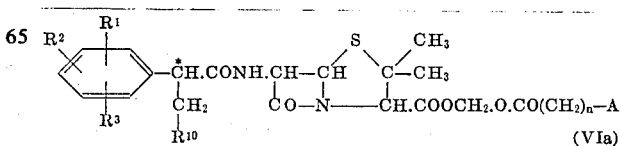

(VIa)

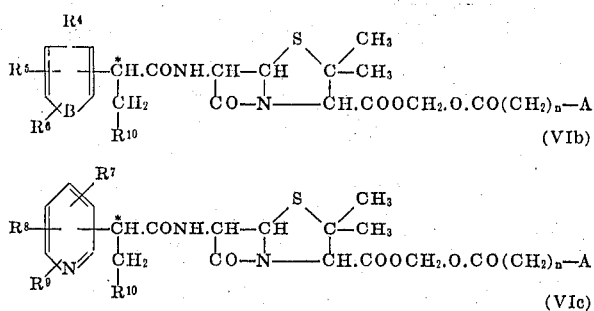

(VIb)

(VIc)

wherein R¹ to R¹⁰, n, and A have the meanings hereinbefore defined, represent interesting intermediates in the synthesis of the compounds of the invention, which intermediates are also new compounds constituting a part of this invention.

These intermediates can also be prepared by reacting a β—R¹⁰-substituted penicillin derivative of one of the formulas (VIIa), (VIIb), and (VIIc):

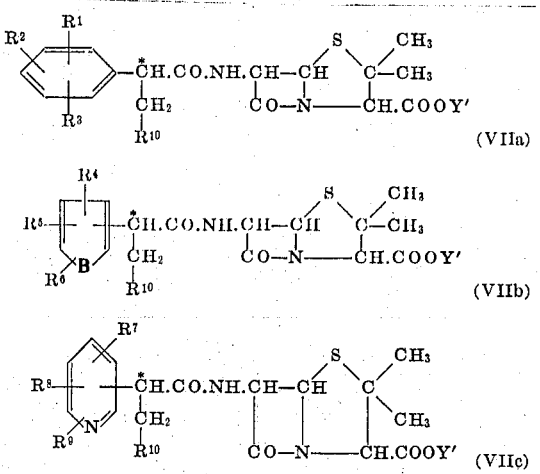

(VIIa)

(VIIb)

(VIIc)

in which formulas R¹ to R¹⁰ have the above defined meanings, and Y' is hydrogen or a cation, such as an alkali metal or a tertiary ammonium group, with a compound of formula (VIII):

X'CH₂OCO(CH₂)ₙ—A in which n and A are as defined hereinbefore, and X' is a halogen atom, preferably chlorine or bromine, an acyloxy radical having from one to 16 carbon atoms, or an alkylsulphonyloxy or arylsulphonyloxy radical. The compounds formed by the reaction are esters of β—R¹⁰—substituted penicillins of one of the formulas (VIa), (VIb), and (VIc). When R¹⁰ is NH₂, the formulas (VIa), (VIb), and (VIc) represent the compounds of the invention, whereas, when R¹⁰ has the other meanings defined above, the formulas (VIa), (VIb), and (VIc) represent the intermediates mentioned before.

The starting compounds of the formulas (VIIa), (VIIb), and (VIIc), in which R¹⁰ is different from NH₂, are known as intermediates in the synthesis of β-aminopenicillins. They exist in two epimeric forms. If the starting compounds are prepared in the form of the D or the L epimers, the corresponding epimeric form of the compounds of the invention will be obtained. If, on the other hand, a mixture of the epimeric forms of the starting compound is used, a mixture is obtained. This mixture can be separated in the individual epimers, for instance by fractional crystallization.

The methods of preparing the starting substances of formulas (VIIa), (VIIb), and (VIIc) are standard procedures and include, for instance, a reaction between a reactive derivative of a compound of formula (IVa), (IVb), or (IVc) and 6-amino-penicillanic acid in which the amino group may be free or substituted, for instance, with a trimethylsilyl radical. The starting compounds of formula (VIII) are known compounds which can be prepared by methods which are standard procedures for this type of compounds.

Among such methods may be mentioned the reaction of an acid halide with paraformaldehyde (as described in e.g. J.A.C.S. 43, 660 (1921)) or the halogenation of methyl esters (as described in e.g. Acta Chem. Scan. 20, 1273 (1966) and references cited there).

The reaction of the compounds of the formulas (VIIa), (VIIb), and (VIIc) with the compounds of formula (VIII) can be performed at or below room temperature or by gentle heating up to the boiling point of the solvent, depending on the meaning of Y' and X'. Different organic solvents or mixtures thereof with water may be used, for example acetone, dioxane, tetrahydrofuran, methylene chloride, or dimethylformamide. The reaction products are crystalline or oily products, which can be used in the next step without further purification. By repeated reprecipitations, the oily products can be obtained as crystalline or amorphous powders.

The subsequent reaction step (VI → I), by which the R¹⁰ group is converted into an amino group, is as described above.

The invention will now be illustrated by the following non-limiting Examples.

EXAMPLE 1

Pivaloyloxymethyl 6-aminopenicillanate
(a) From 6-aminopenicillanic acid (6-APA)

To a suspension of 6-APA (0.25 mole) in dimethylformamide (DMF) (250 ml) were added triethylamine (Et₃N) (0.35 mole) and, after stirring for 0.5 hours, chloromethyl pivalate (0.5 mole). After stirring at 26°–28 C for 4 hours, the mixture was diluted with ethyl acetate (EtOAc) (750 ml); the precipitate of Et₃N, HCl which formed was filtered off, and the filtrate was washed with H₂O (4 × 250 ml) to remove the greater part of DMF and unreacted 6-APA. The organic layer was dried and concentrated to about half the volume under reduced pressure (bath-temperature 35° C). Treatment of the stirred solution of the crude ester with 0.5 M p-toluenesulphonic acid (p-TsOH) in EtOac (450 ml) at 25° C precipitated the crystalline p-toluenesulfonate which was filtered off, washed with EtOAc followed by ether, and dried to yield 101.2 g (80 percent) of colorless needles, m.p. 148°–149° C (dec.). Recrystallization from methanol-EtOAc furnished the analytical sample, m.p. 150°–151° C. (dec.), [α]_D + 133° (methanol). IR (KBr) 1795 (β-lactam) and 1765 cm⁻¹ (ester); nmr (CDCl₃) 1.17 (s, 9 H C(CH₃)₃), 1.38 and 1.44 (2 s, 6 H, C(CH₃)₂), 4.45 (s, 1 H, CH—3), 4.98 and 5.40 (2 d, J=4 cps, 2 H, CH—5 and CH—6), 5.72 and 5.83 ppm (AB q, J=5.5 cps, 2 H, OCH₂O).

Analysis:
Calculated for C₂₁H₃₀N₂O₈S₂: C 50.18, H 6.01, N 5.57, S 12.76
Found : C 50.08, H 6.03, N 5.53, S 12.82.

A crystalline hydrochloride, m.p. 156°–160° C (dec.), $[\alpha]_D + 183°$ (0.1N HCl) was obtained by adding 1N HCl in isopropanol to a stirred solution of crude 6-APA pivaloyloxymethyl ester in EtOAc.
Analysis:
Calculated for $C_{14}H_{23}Cl\ N_2O_5S$: C 45.84, H 6.32, Cl 9.66,
N 7.63, S 8.74
Found : C 45.60, H 6.39, Cl 9.76,
N 7.54, S 8.83.

(b) From pivaloyloxymethyl benzylpenicillante

To a solution of $PCl_5$ (0.16 mole) in dry, alcohol-free $CHCl_3$ (320 ml) was added quinoline (0.31 mole) with stirring. The solution was cooled to −10° C, and pivaloyloxymethyl benzylpenicillinate (0.14 mole) was added. After stirring for 15 minutes at −10° C n-propanol (105 ml) was added at 5°–10° C during 5 minutes. The temperature was kept at −10° C for a further 15 minutes, and then a solution of NaCl (50 g) in $H_2O$ (220 ml) was added with vigorous stirring. During this process the temperature rose to 0° C. After addition of light petroleum (450 ml) the solution was seeded with crystals from an earlier preparation and after stirring for 10 minutes a further 500 ml of light petroleum was added during 5–10 minutes. Stirring was continued for 15 minutes at 0° C, after which the aqueous phase was separated and the precipitate in the organic phase was collected. The filter cake was suspended in a mixture of saturated aqueous NaCl (200 ml) and $H_2O$ (10 ml); the suspension was filtered, and the filter cake was washed with saturated aqueous NaCl followed by ether to yield 52.4 g of the hydrochloride of the desired compound, $[\alpha]_D + 161°$ (0.1N HCl). Apart from a content of NaCl the product was pure and could be used for the acylation step without further purification.

The starting material can be prepared in the following manner:

Pivaloyloxymethyl benzylpenicillinate

To a suspension of potassium benzylpenicillinate (19.0 g) in 200 ml of acetone was added chloromethyl pivalate (8.3 ml) followed by a solution of sodium iodide (1.25 g) in 50 ml of water. The mixture was refluxed for 5 hours. After cooling, the potassium chloride was removed by filtration. By adding water to the filtrate, the desired compound was obtained as a colorless crystalline product with a melting point of 114°–115° C.
Analysis:
Calculated for $C_{22}H_{28}N_2O_6S$: C 58.91, H 6.30, N 6.24
Found : C 58.82, H 6.33, N 6.28. $[\alpha]_D^{20} + 236°$ (c=1, methanol). Thin-layer chromatography on silica gel (Merck $HF_{254}$) showed a pure product.

$R_F$=0.45 (cyclohexane-ethyl acetate, 1+1)

$R_F$=0.86 (butanol-ethanol-$H_2O$, 4+1+1)

Analogous to the preparation of pivaloyloxymethyl 6-aminopenicillanate (method a) the following acyloxymethyl esters of 6-APA were prepared from 6-APA and the corresponding chloromethyl esters:

Acetoxymethyl 6-aminopenicillanate — Obtained as a crystalline p-toluenesulfonate, m.p. 147–148° C (dec.), $[\alpha]_D^{20} +133°$ (methanol).
Analysis:
Calculated for $C_{18}H_{24}N_2O_8S_2$: C 46.95, H 5.25, N 6.08, S 13.92
Found : C 46.84, H 5.17, N 5.86, S 13.79.

Propionyloxymethyl 6-aminopenicillanate — Obtained as a crystalline p-toluenesulfonate, m.p. 135°–136° C (dec.), $[\alpha]_D + 128°$ (methanol).
Analysis:
Calculated for $C_{19}H_{26}N_2O_8S_2$: C 48.09, H 5.52, N 5.90, S 13.51
Found : C 48.03, H 5.70, N 5.84, S 13.53.
iso-Butyryloxymethyl 6-aminopenicillanate — Obtained as a crystalline p-toluenesulfonate, m.p. 132°–133° C (dec.), $[\alpha]_D + 133°$ (methanol).
Analysis:
Calculated for $C_{20}H_{28}N_2O_8S_2$: C 49.16, H 5.78, N 5.73, S 13.13
Found : C 49.39, H 5.81, N 5.59, S 12.96.
Valeroyloxymethyl 6-aminopenicillanate — Obtained as a crystalline p-toluenesulfonate, m.p. 131°–132° C (dec.), $[\alpha]_D + 126°$ (methanol).
Analysis:
Calculated for $C_{21}H_{30}N_2O_8S_2$: C 50.18, H 6.01, H 5.57, S 12.76
Found : C 50.20, H 6.06, N 5.44, S 12.78.
α-Ethyl-n-butytyloxymethyl 6-aminopenicillanate — Obtained as a crystalline p-toluenesulfonate, m.p. 139°–140° C (dec.), $[\alpha]_D + 123°$ (methanol).
Analysis:
Calculated for $C_{22}H_{32}N_2O_8S_2$: C 51.14, H 6.24, N 5.42, S 12.41
Found : C 51.09, H 6.18, N 5.49, S 12.46.
Benzoyloxymethyl 6-aminopenicillanate — Obtained as a crystalline p-toluenesulfonate, m.p. 143°–144° C (dec.), $[\alpha]_D + 121°$ (methanol).
Analysis:
Calculated for $C_{23}H_{26}N_2O_8S_2$: C 52.86, H 5.02, N 5.36, S 12.27
Found : C 52.50, H 5.04, N 5.29, S 12.41.

EXAMPLE 2

Pivaloyloxymethyl D(-)-β-amino-α-phenylethylpenicillinate Hydrochloride

Pivaloyloxymethyl 6-aminopenicillanate, p-toluenesulfonate (2.52 g) was added with efficient stirring to a mixture of 0.2 M aqueous potassium bicarbonate (35 ml) and ethyl acetate (70 ml). The layers were separated, the aqueous phase was extracted with ethyl acetate (35 ml), and the combined organic extracts were washed with water (2 × 10 ml), dried over anhydrous magnesium sulphate, and concentrated in vacuo to a volume of 50 ml.

To this solution of pivaloyloxymethyl 6-aminopenicillanate were added water (1 ml), sodium bicarbonate (0.63 g), and D(-)-β-amino-α-phenylpropionyl chloride, hydrochloride (1.21 g) at 0° C with stirring. After stirring for 2 hours at 0° C, the reaction mixture was filtered through dicalite, the filter cake was washed with ethyl acetate — water, 98:2, (50 ml), and water (50 ml) was added to the combined filtrate and washings. Then, the pH of the aqueous phase was adjusted to 2.5 by addition of 0.5N hydrochlorid acid with stirring, the phases were separated, and the organic layer was re-extracted with water (pH 2.5, 25 ml). The combined aqueous extracts were freeze-dried to give 2.56 g of the desired compound as a colorless amorphous powder, contaminated with the hydrochloride of β-amino-α-phenylpropionic acid and inorganic salt. To remove these impurities, the freezedried product was dissolved in water (50 ml); ethyl acetate (50 ml) and saturated aqueous sodium bicarbonate (15 ml) were added with stirring, and the layers were separated. After extraction of the aqueous layer with ethyl acetate (25 ml), the combined organic phases were washed with water until neutral, and diluted with ether (75 ml). To the resulting solution, water (75 ml) was added, and the pH of the aqueous phase was adjusted to 2.5 by addition of 0.5N hydrochloric acid with stirring. After separation, the aqueous layer was freeze-dried to yield the desired compound as a colorless amorphous powder having a purity of 99 percent, determined iodometrically.
$[\alpha]_D^{20} + 196°$ (c=0.5 in $H_2O$).
I.R. (KBr): 1785–1780 ($\beta$-lactam), 1760 (ester), and 1775 $cm^{-1}$ (amide).
N.M.R. ($D_2O$): Signals at $\delta = 7.41$ (s, 5 H, arom. CH), 5.85 and 5.70 (AB q, J=7 cps, 2 H, $OCH_2O$), 5.49 (s, 2H,
CH—5 and CH—6), 4.53 (s, 1 H, CH—3), 4.17 (m, 1 H, $C_6H_5CH$),
3.53 (m, 2 H, $CHCH_2N$), 1.36 and 1.30 (2 s, 6 H, $C(CH_3)_2$), and 1.10 (s, 9 H, $C(CH_3)_3$) ppm. TMS was used as external reference.

By substituting, respectively:
$\beta$-Amino-$\alpha$-(3-chlorophenyl)-propionyl chloride hydrochloride,
$\beta$-Amino-$\alpha$-(4-chlorophenyl)-propionyl chloride hydrochloride,
$\beta$-Amino-$\alpha$-(2-methoxyphenyl)-propionyl chloride hydrochloride,
$\beta$-Amino-$\alpha$-(4-methoxyphenyl)-propionyl chloride hydrochloride,
$\beta$-Amino-$\alpha$-(3,4-dimethylphenyl)-propionyl chloride hydrochloride, and
$\beta$-Amino-$\alpha$-(2,4-dimethylphenyl-propionyl chloride hydrochloride
for the D(-)-$\beta$-amino-$\alpha$-phenylpropionyl chloride hydrochloride, the following penicillin esters were obtained:
Pivaloyloxymethyl $\beta$-amino-$\alpha$-(3-chlorophenyl)-ethyl penicillinate,
Pivaloyloxymethyl $\beta$-amino-$\alpha$-(4-chlorophenyl)-ethyl penicillinate,
Pivaloyloxymethyl $\beta$-amino-$\alpha$-(2-methoxyphenyl)-ethyl penicillinate,
Pivaloyloxymethyl $\beta$-amino-$\alpha$-(4-methoxyphenyl)-ethyl penicillinate,
Pivaloyloxymethyl $\beta$-amino-$\alpha$-(3,4-dimethylphenyl)-ethyl penicillinate, and
Pivaloyloxymethyl $\beta$-amino-$\alpha$-(2,4-dimethylpehnyl)-ethyl penicillinate, respectively,
all in the form of their hydrochlorides.

EXAMPLE 3

Pivaloyloxymethyl D(-)-$\beta$-amino-$\alpha$-phenylethylpenicillinate Hydrochloride To a solution of D(-)-N-carbobenzoxy-$\beta$-amino-$\alpha$-phenylpropionic acid (2.99 g) in ethyl acetate (75 ml) were added triethylamine (1.4 ml), N-methylmorpholine (1 drop), and isobutyl chloroformate (1.39 ml) at −16° C with stirring. Potassium chloride separated immediately, and the mixture was kept at −16° C for 6 minutes. To the solution of the mixed anhydride thus obtained was added an ice-cold solution of pivaloyloxymethyl 6-aminopenicillanate in ethyl acetate (75 ml), prepared from the p-toluenesulfonate of this compound (5.02 g) in a similar way as described in Example 2. During the addition of the 6-APA ester solution with stirring, the temperature in the reaction mixture was kept between −14° C and −16° C. Thereafter the cooling-bath was removed, and stirring continued until the temperature of the mixture had raised to 10° C (about 40 minutes). Then the mixture was filtered, washed with 0.5 M aqueous sodium bicarbonate (25 ml) and water until neutral. To the solution of crude pivaloyloxymethyl D(-)-N-carbobenzoxy-$\beta$-amino-$\alpha$-phenylethylpenicillinate in ethyl acetate (about 150 ml), placed in a four-necked 500 ml-flask equipped with an efficient stirrer, a gas inlet tube, a gas outlet tube, a glass-calomel combination electrode, and a burette controlled by an automatic titrator, were added water (100 ml) and 10 percent palladium on carbon catalyst (5 g). The system was flushed with nitrogen, and thereafter a stream of hydrogen was bubbled through the suspension with stirring, a pH-value of 2.5 being maintained in the aqueous phase by addition of 0.5N hydrochloric acid via the automatic titrator. When the consumption of acid stopped, the flask was flushed with nitrogen until all hydrogen was removed, and the catalyst was filtered off. The layers of filtrate were separated, the organic phase was extracted with water (pH 2.5, 50 ml), and the combined aqueous extracts were washed with ether (25 ml) and freeze-dried to yield the desired compound as a colorless amorphous powder of a purity of 90 percent, determined iodometrically. $[\alpha]_D^{20} + 183°$ (c=0.5 in $H_2O$).

The identity with the product obtained in Example 2 was demonstrated by comparing the I.R. spectra and TLC-data.

EXAMPLE 4

Acetoxymethyl $\beta$-amino-$\alpha$-(1-naphthyl)-ethylpenicillinate Hydrochloride A solution of acetoxymethyl 6-aminopenicillanate in ethyl acetate (50 ml) was prepared from 2.30 g of its p-toluenesulfonate in a manner analogous to the preparation of pivaloyloxymethyl 6-aminopenicillanate described in Example 2. At 0° C, water (1 ml), solid $NaHCO_3$ (0.63 g), and D,L-$\beta$-amino-$\alpha$-(1-naphthyl)-propionyl chloride were added with stirring. After stirring at 0° C for 2 hours, the mixture was filtered through dicalite, and the clear filtrate was evaporated in vacuo. The yellowish residue was dissolved in isopropanol (25 ml) and reprecipitated by addition of ether (50 ml) to yield the desired compound as a colorless amorphous powder, which was easily soluble in water.

EXAMPLE 5

Benzoyloxymethyl $\beta$-amino-$\alpha$-(2-thienyl)-ethylpenicillinate Hydrochloride A solution of benzoyloxymethyl 6-aminopencillanate in ethyl acetate (150 ml) was prepared from 7.84 g of its p-toluenesulfonate in a manner analogous to the preparation of pivaloyloxymethyl 6-aminopenicillanate described in Example 2. At 0° C, water (3 ml), solid $NaHCO_3$ (1.89 g), and D,L-$\beta$-amino-$\alpha$-(2-thienyl)-propionyl chloride, hydrochloride (4.07 g) were added with stirring.

Stirring was maintained for 3 hours at 0° C. The mixture was filtered through diatomaceous earth, and the clear filtrate was evaporated *in vacuo*. The colorless residue was reprecipitated from isopropanol-ether, collected on a filter, and washed with isopropanol-ether to yield the desired compound.

EXAMPLE 6

Pivaloyloxymethyl D,L-β-amino-α-(4-hydroxyphenyl)-ethyl-penicillinate a. A mixture of D,L-β-amino-α-(4-methoxyphenyl)-propionic acid, hydrochloride (20 g, prepared as described in *J.Org.Chem.* 26, 4062 (1961)and 48 percent aqueous hydrobromic acid (220 ml) was refluxed in a nitrogen atmosphere for 135 minutes. After cooling, the reaction mixture was evaporated *in vacuo*; water (200 ml) was added to the crystalline residue thus obtained, and the resulting solution was evaporated *in vacuo* to leave a crystalline mass. To this residue, saturated aqueous sodium acetate (100 ml) was added, and the aminoacid (17.4 g) was filtered off. Recrystallization of the product from water, followed by washing of the crystals with water, ethanol, and ether yielded D,L-β-amino-α-(4-hydroxyphenyl)-propionic acid as the hemihydrate, m.p. 242°–244° C (dec.).

b. To a stirred solution of 1.90 g of D,L-β-amino-α-(4-hydroxyphenyl)-propionic acid, hemihydrate in water (25 ml) was added 2N NaOH (5 ml), and the clear solution thus obtained was cooled to 0° C. Thereafter, 10 ml of 2N NaOH, followed by 4.26 ml of carbobenzyloxy chloride were added with stirring, the temperature being kept between 0° and 5° C during the addition. After stirring for 1 hour at low temperature, the reaction mixture was diluted with water (100 ml), the pH-value of the mixture was adjusted to 10 by adding 2N NaOH, and the suspension thus obtained was extracted with ether (3 × 100 ml). The aqueous phase was separated, and ethyl acetate (100 ml) was added. While stirring, the pH-value in the aqueous phase of the mixture was adjusted to 2.0 by adding 4N HCl.

After separation of the organic layer, the aqueous phase was extracted with a further 100 ml of ethyl acetate, and the combined organic extracts were washed with water, dried, and evaporated *in vacuo* to leave an oily residue from which the desired compound slowly crystallized. The crystalline product was suspended in ether (25 ml) with stirring, and filtered off to yield 3.69 g of O,N-di-benzyloxycarbonyl D,L-β-amino-α-(4-hydroxyphenyl)-propionic acid, m.p. 133°–134° C.

c. To a solution of O,N-dibenzyloxycarbonyl D,L-β-amino-α-(4-hydroxyphenyl)-propionic acid (4.50 g) and triethylamine (1.42 ml) in ethyl acetate (80 ml) was added isobutyl chloroformate (1.4 ml) at −10° C with stirring. Triethylamino hydrochloride separated, and the mixture was kept at the low temperature for 4 minutes. Then an ice-cold solution of pivaloyloxymethyl 6-aminopenicillanate in ethyl acetate (40 ml) - prepared from 5.02 g of the crystalline p-toluenesulphonate of this compound — was added with stirring. During the addition, and then for a further 10 minutes, the temperature of the mixture was kept between −10° C and −5° C. After removal of the cooling bath and stirring for 30 minutes at room temperature, the mixture was extracted with 0.5 M aqueous sodium bicarbonate (2 × 15 ml) and washed with water until neutral. The solution of crude pivaloyloxymethyl O,N-dibenzyloxycarbonyl D,L-β-amino-α-(4-hydroxyphenyl)-ethylpenicillinate in ethyl acetate (about 120 ml) thus obtained was placed in a four-necked 500 ml-flask equipped with an efficient stirrer, a gas inlet tube, a gas outlet tube, a glass-calomel combination electrode, and a burette controlled by an automatic titrator. Water (100 ml) and 10 percent palladium on carbon catalyst (6 g) were added, and the system was flushed with nitrogen. Thereafter, a stream of hydrogen was bubbled through the suspension with stirring, a pH-value of 2.5 being maintained in the aqueous phase by addition of 0.5N hydrochloric acid via the automatic titrator. When the consumption of acid had stopped, the flask was flushed with nitrogen until all hydrogen was removed. The catalyst was filtered off, and the aqueous phase was separated from the filtrate. To the organic layer were added ether (100 ml) and water (100 ml), the pH-value in the aqueous phase was adjusted to 2.5 by adding 0.5N hydrochloric acid with stirring, and the aqueous layer was separated. The combined aqueous phases were washed with ether (40 ml) and freeze dried to yield 2.68 g of the hydrochloride of the desired compound as a colorless amorphous product with a purity of 86 percent.

EXAMPLE 7

Pivaloyloxymethyl D,L-β-amino-α-(3-chloro-4-hydroxyphenyl)-Ethylpenicillinate a. A stream of HCl-gas was bubbled through a suspension of 1.90 g of D,L-β-amino-α-(4-hydroxyphenyl)-propionic acid, hemihydrate in acetic acid (40 ml) for 5 minutes with stirring. From the clear solution immediately obtained, the hydrochloride of the starting material crystallized. Thereafter, a solution of 0.96 ml of sulfuryl chloride in acetic acid (10 ml) was added dropwise to the suspension with stirring, the temperature being kept between 26° and 28° C during the addition (10 minutes). The clear solution thus obtained was stirred for 50 minutes, and then, ether (100 ml) was added, and a colorless product crystallized from the mixture. After stirring for 10 minutes and cooling, the crystals were filtered off, washed with ether, and dried. The product thus obtained was taken up in 1N HCl (20 ml) and filtered, and the pH-value of the filtrate was adjusted to 5.0 by adding 25 percent aqueous NH₃ with stirring. The mixture was cooled, and the crystalline D,L-β-amino-α-(3-chloro-4-hydroxyphenyl)-propionic acid, which precipitated, was filtered off, washed with water followed by acetone, and dried to yield 1.76 g with m.p. 231°–232° C (dec.).

b. To a stirred suspension of 2.16 g of D,L-β-amino-α-(3-chloro-4-hydroxyphenyl)-propionic acid in water (25 ml) were added 2N NaOH (15 ml) and carbobenzyloxy chloride (4.26 ml) at 0° C. After stirring for 1 hour at the low temperature, the reaction mixture was worked up in the same way as described in Example 6 (b) to give D,L-β-benzyloxycarbonylamino-α-(3-chloro-4-hydroxyphenyl)-propionic acid (3.02 g) as a colorless gum.

c. A solution of D,L-β-benzyloxycarbonylamino-α-(3-chloro-4-hydroxyphenyl)-propionic acid (2.62 g) and triethylamine (1.05 ml) in ethyl acetate (60 ml)

was cooled to −10° C. Isobutyl chloroacetate (1.05 ml) was added with stirring, and the mixture was kept at −10° C for 4 minutes. Then, an ice-cold solution of pivaloyloxymethyl 6-amino-penicillanate in ethyl acetate (30 ml) — prepared from 3.77 g of the crystalline p-toluenesulfonate of this compound — was added with stirring, the temperature in the mixture being kept between −10° C and −5° C during the acylation. After stirring for a further 10 minutes at low temperature, and then for 40 minutes without external cooling, the mixture was extracted with 0.5 M aqueous sodium bicarbonate (2 × 10 ml) and washed with water until neutral. To the solution of crude pivaloyloxymethyl D,L-β-benzyloxycarbonylamino-α-(3-chloro-4-hydroxyphenyl)-ethylpenicillinate in ethyl acetate thus obtained, were added water (100 ml) and 10% palladium on carbon catalyst (4.5 g), and the mixture was hydrogenated in the same way as described in Example 6 (c). When the reaction was finished, the catalyst was filtered off, and the filtrate was worked up analogously to the procedure described in Example 6 (c). Freezedrying of the aqueous phase thus obtained gave 2.2 g of the hydrochloride of the desired compound as a colorless amorphous powder with a purity of 82 percent.

EXAMPLE 8

Pivaloyloxymethyl D,L-β-amino-α-(3-aminophenyl)-ethylpenicillinate a. D,L-β-Amino-α-phenylpropionic acid (15 g) (prepared as described in Ann. 614, 167 (1958)) was nitrated at 5°–10° C with a mixture of concentrated sulphuric acid (16 ml) and fuming nitric acid (12 ml) to give D,L-β-amino-α-(3-nitrophenyl)-propionic acid. Hydrogenation of a solution of the sodium salt of this compound (12 g) in water (160 ml) over 10 percent palladium on carbon catalyst (1.2 g) at room temperature and normal pressure yielded D,L-β-amino-α-(3-aminophenyl)-propionic acid.

b. Treatment of D,L-β-amino-α-(3-aminophenyl)-propionic acid (1.8 g) in ice-cold dilute aqueous alkali with carbobenzyloxy chloride (4,26 ml) in an analogous way as described in Example 6 (b) gave N,N-dibenzyloxycarbonyl D,L-β-amino-α-(3-aminophenyl)-propionic acid as an yellowish oil.

c. The protected aminoacid (3.36 g) was coupled with pivaloyloxymethyl 6-aminopenicillanate by a similar procedure to that of Example 6 (c) to give a solution of crude pivaloyloxymethyl N,N-dibenzyloxycarbonyl D,L-β-amino-α-(3-aminophenyl)-ethylpenicillinate in ethyl acetate. Catalytic hydrogenation of the protected penicillin ester in the same way as described in Example 6 (c), followed by an analogous work-up procedure gave 2.14 g of the dihydrochloride of the desired diaminopenicillin ester as a slightly yellowish amorphous powder. The purity of the product was 76 percent.

EXAMPLE 9

Pivaloyloxymethyl β-amino-α-phenylethylpenicillinate a. Sodium bicarbonate (7.06 g) was added to a suspension of 6-aminopenicillanic acid (8.09 g) in water (60 ml) while stirring, and the resulting clear solution was diluted with acetone (15 ml) and cooled to 5° C. Then, a solution of β-azido-α-phenylpropionyl chloride (6.71 g) in acetone (15 ml) was added while stirring, the temperature being kept between 5° and 10° C during the acylation. After stirring for further 40 minutes at room temperature, the mixture was extracted with ether (2 × 25 ml). The aqueous phase was separated, ether (50 ml) was added, and the pH in the aqueous phase was adjusted to 2.5 by addition of 2N hydrochloric acid, while stirring. The organic layer was separated, the aqueous phase was re-extracted with ether (50 ml), and the combined ethereal extracts were washed with water (2 × 10 ml). To this organic solution was added water (80 ml), and the pH in the aqueous phase was adjusted to 6.5 by addition of 2 M aqueous potassium bicarbonate, while stirring. The aqueous phase was separated, washed with ether (20 ml), and freeze-dried to yield 9.58 g of potassium β-azido-α-phenylethylpenicillinate with a purity of 98 percent.

β-Azido-α-phenylpropionyl chloride used in the reaction described above was obtained from β-azido-α-phenyl-propionic acid and thionyl chloride by refluxing a solution of equimolar amounts of the two compounds in benzene for 1 hour, followed by evaporation of the mixture to dryness *in vacuo*. β-Azido-α-phenylpropionic acid was prepared from β-bromo-α-phenylpropionic acid in an analogous manner as described in the specification to Belgian Pat. No. 641,516 for the preparation of several 2-azidomethyl-2-phenylcarbonic acids.

b. To a suspension of potassium β-azido-α-phenylethyl-penicillinate (4.28 g) in acetone (50 ml) and 10 percent aqueous sodium iodide (1 ml) was added chloromethyl pivalate (2.96 ml), and the mixture was refluxed for 4 hours. After cooling, the suspension was filtered, the filtrate was evaporated *in vacuo*, and the remaining residue was washed repeatedly by decantation with petroleum ether to remove excess of chloromethyl pivalate. The oily residue thus obtained was taken up on ethyl acetate (60 ml), washed with aqueous sodium bicarbonate followed by water, and dried. Removal of the solvent *in vacuo* gave 4.23 g of crude pivaloyloxymethyl β-azido-α-phenylethylpenicillinate as a gum, which was used for the next step without further purification.

c. To a solution of crude pivaloyloxymethyl β-azido-α-phenylethylpenicillinate (4 g) in ethyl acetate (50 ml) were added water (50 ml) and 10 percent palladium on carbon catalyst (4 g), and the mixture was hydrogenated in a similar way as described in Example 3. When the reaction was finished, the catalyst was filtered off, and the acidic aqueous phase was separated, washed with ether, and freezedried to yield 1.66 g of the hydrochloride of the desired compound as a colorless amorphous powder with a purity of 83 percent.

EXAMPLE 10 iso-Butyryloxymethyl β-azido-α-phenylethylpenicillanate

To a mixture of 0.2 M aqueous potassium bicarbonate (35 ml) and ethyl acetate (50 ml) was added iso-butyryloxymethyl 6-aminopenicillanate, p-toluenesulfonate (2.44 g) with efficient stirring. The phases were separated, the aqueous layer was extracted with ethyl acetate (50 ml), and the combined organic extracts were washed with water (2 × 10 ml), dried, and concentrated to a volume of about 50 ml *in vacuo*. To this solution of iso-butyryloxymethyl 6- aminopenicillanate, were added water (1 ml), solid sodium bicarbonate (0.63 g), and a solution of β-azido-α-phenylpropionyl chloride (1.05 g) in ethyl acetate (10 ml) at 0° C while stirring. After stirring for 1 hour at 0°–5° C, the cooling bath was removed, and stirring continued until the temperature of the mixture had risen to 20° C (about 30 minutes). Thereafter, the mixture was filtered, and the filtrate was washed with 0.5 M aqueous sodium bicarbonate, followed by water. To the solution of crude isobutyryloxymethyl β-azido-α-phenylethylpenicillinate in ethyl acetate thus obtained were added water (60 ml) and 10 percent on carbon catalyst (2.5 g), and the mixture was hydrogenated in the same way as described in Example 3. When the reaction was finished, the catalyst was filtered off, and aqueous phase was separated, washed with ether, and freeze-dried to yield 1.05 g of the hydrochloride of the desired compound as a yellowish amorphous powder. The purity of the product was determined iodometrically to be 79 percent.

What we claim is:

1. A compound selected from the group consisting of esters of a semi-synthetic penicillin and pharmaceutically acceptable salts thereof of the formula:

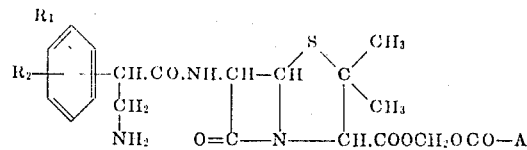

wherein $R_1$ and $R_2$ are hydrogen, halogen, hydroxy, or methoxy and A is alkyl having from one to six carbon atoms.

2. A compound as claimed in claim 1 wherein $R_1$ and $R_2$ are hydrogen.

3. Pivaloyloxymethyl β-amino-α-phenylethylpenicillinate and its hydrochloride.

4. Pivaloyloxymethyl D(-)-β-amino-α-phenylethylpenicillinate and its hydrochloride.

5. Pivaloyloxymethyl-β-amino-α-(p-hydroxyphenyl)ethyl-Penicillinate and its hydrochloride.

6. Pivaloyloxymethyl-β-amino-α-(p-methoxyphenyl)ethyl-penicillinate and its hydrochloride.

7. Pivaloyloxymethyl-β-amino-α-(m-chloro-p-hydroxyphenyl)ethyl-penicillinate and its hydrochloride.

* * * * *